May 14, 1940. L. RICEFIELD 2,200,640
COUPLING
Filed July 9, 1938
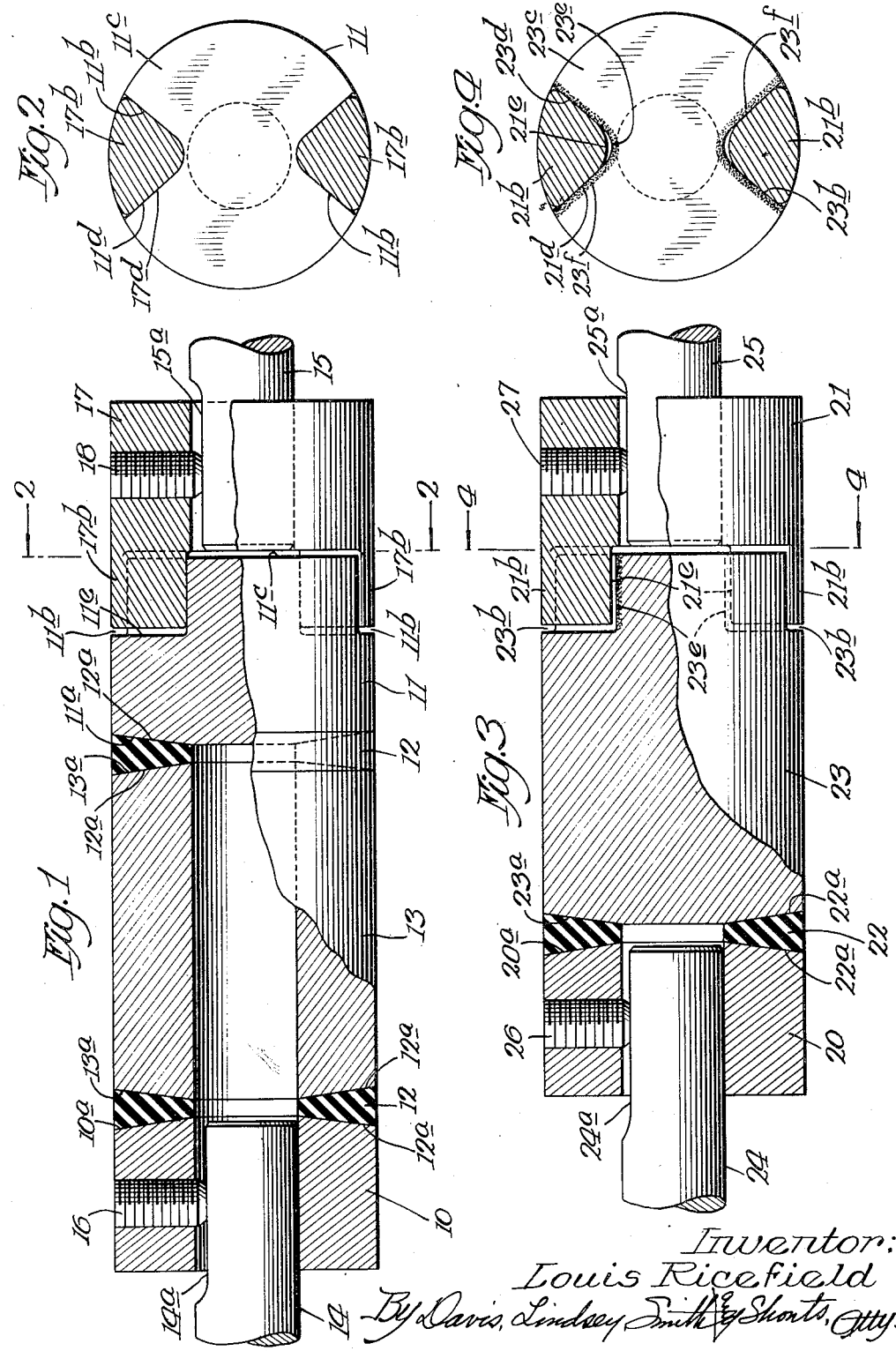

Patented May 14, 1940

2,200,640

UNITED STATES PATENT OFFICE 2,200,640

COUPLING

Louis Ricefield, Oak Park, Ill.

Application July 9, 1938, Serial No. 218,278

8 Claims. (Cl. 64—14)

This invention relates to improvements in couplings for connecting substantially aligned shafts and its purpose is to provide an improved device which will compensate for angular misalignment, relative lateral displacement, and relative endwise movement of two connected shafts.

The improved coupling of the present invention is capable of various uses but is particularly adapted for use in connecting shafts of small size through which a small amount of power is to be transmitted and which have their adjacent ends spaced a substantial distance apart. Small shafts which are thus spaced apart have heretofore been connected by a coupling comprising two coupling members secured upon the two shafts and connected by an intermediate flexible member, or "hose," formed of rubber or the like, which is capable of stretching and becoming distorted to compensate for faulty alignment or relative endwise movement of the shafts. These prior devices have been objectionable because the intermediate flexible member, being of substantial length, has been distorted angularly to an excessive degree by the torsional stresses transmitted therethrough, with a resulting stretching of the fibers of the material and a shortening of the effective length of the member as a whole, thereby drawing the connected shafts toward each other and producing end thrusts on the bearings in which the shafts are mounted. These conditions have brought about a relatively rapid deterioration of the coupling and of the shaft bearings. Even when the ends of such a coupling are permitted to move longitudinally with respect to the shafts, the twisting of the coupling body under torsional strain stretches and distorts the fibers with resulting damage to the coupling.

The principal object of the invention is to provide an improved coupling adapted for use in connecting shafts which have their adjacent ends spaced a substantial distance apart and comprising an intermediate power transmitting member of hard material which is flexibly connected to one or both of two coupling members by means adapted to compensate for lack of alignment of the shafts, one of the coupling members being connected to one of the shafts in a manner adapted to permit relative endwise movement of the two connected shafts without setting up stresses longitudinally of the coupling in any of its parts. Still another object of the invention is to provide an improved coupling comprising an intermediate power transmitting member of substantial length and formed of hard material which is flexibly connected by relatively soft resilient material with a coupling member secured upon one of the shafts and which is connected with a coupling member secured to the other of the shafts by an interlocking driving connection comprising intermeshing jaws adapted to permit relative endwise movement of the connected parts. A further object of the invention is to provide a coupling comprising two coupling members each adapted to be secured upon one of two substantially aligned shafts, in combination with an elongated intermediate power transmitting member which is flexibly connected at one end with one of the coupling members by means adapted to compensate for lack of alignment of the shafts and which is provided at its other end with a plurality of longitudinally extending sockets having walls of comparatively soft material which are adapted to be engaged by jaws formed on the other coupling member. Other objects relate to various features of construction and arrangement which will appear more fully hereinafter.

The nature of the invention will be understood from the following specification taken with the accompanying drawing in which two embodiments are illustrated. In the drawing, Figure 1 shows a side elevation of one form of coupling embodying the invention, with parts thereof illustrated in longitudinal vertical section;

Fig. 2 shows a transverse section taken on the line 2—2 of Fig. 1;

Fig. 3 shows a side elevation of another form of coupling embodying the invention, with parts thereof illustrated in longitudinal vertical section; and Fig. 4 shows a transverse section taken on the line 4—4 of Fig. 3.

In the form of the invention shown in Figs. 1 and 2, the coupling comprises a pair of coupling members 10 and 11, formed of hard material, such as steel, brass, hard rubber or the like, which are connected by similar connecting members or rings 12 with an intermediate power transmitting member 13. One of the coupling members 10 is provided with a central bore which is engaged by the end of a shaft 14 which is connected by the coupling with another substantially aligned shaft 15. The shaft 14 has its extremity flattened at one side, as shown at 14a, for coaction with a set screw 16 which engages a threaded aperture in the coupling member 10 and which is provided at its inner end with a flat surface adapted to seat upon the surface 14a to establish a driving connection between the shaft and coupling member. The other coupling member 11 is connected through a plurality of intermeshing parts with an auxiliary coupling member or driving member 17 which is secured upon the other shaft 15. This shaft is also provided on one side with a flattened portion 15a adapted to be engaged by a set screw 18 which is mounted in a threaded aperture in the coupling member 17 and which has a flat surface on its inner end adapted to coact with the surface 15a.

All of the members 10, 11, 12, 13 and 17 are of circular cross section and the members 11, 13 and 17, like the member 10, are formed of hard material, such as steel, brass, hard rubber or the like, which will be substantially incompressible and not subject to distortion under the influence of the forces which are transmitted from one shaft to the other. The connecting members 12 are preferably formed of soft rubber or rubber which is reinforced with textile fabric or the like, or other similar deformable material which is resilient and relatively soft so that it is capable of being distorted to compensate for lack of alignment of the two shafts 14 and 15. These connecting rings 12 are preferably vulcanized on their end surfaces to the end surfaces of the coupling members 10 and 11 and to the end surfaces of the intermediate member 13, thus providing, in effect, an integral construction while securing the advantage of an intermediate member 13 which is not subject to angular distortion under the influence of the forces which are transmitted through the coupling. The inner end surfaces 10a and 11a of the coupling members are preferably tapered outwardly away from the intermediate member 13 and the end surfaces 13a of the intermediate member are similarly tapered outwardly and away from the end surfaces 10a and 11a of the coupling members. The connecting members 12 contact on their end faces with and are secured to these surfaces 10a, 11a and 13a, and the end faces 12a of each connecting member thus diverge outwardly. The connecting rings 12 thus have a gradually increasing thickness toward their outer margins so that there is a greater body of deformable material near the outer circumference of the coupling member where the greatest degree of deformation occurs when the shafts are out of alignment with each other.

In order to permit relative endwise movement of the shafts 14 and 15 without setting up stresses acting longitudinally of the coupling in any of its parts, the coupling member 11 is connected with the driving member or auxiliary coupling member 17 by connections which permit free relative endwise movement of these parts. For this purpose, the coupling member 11 is provided on diametrically opposite sides thereof with two inwardly extending sockets 11b which open through the end face 11c of the member 11 and with outwardly diverging walls 11d adapted to coact with the outwardly diverging faces 17d of two longitudinally extending lugs or jaws 17b which are formed integrally with and extend longitudinally from the body portion of the member 17. Some clearance is preferably provided between the end face of the member 11 and the end face of the member 17 between the jaws 17b, and a similar clearance is also provided between the ends of the jaws 17b and the end faces 11e of the sockets 11b when the parts are in their relative normal positions, so that, upon relative endwise movement of the shafts 14 and 15 in either direction, the jaws 17b may slide freely in the sockets 11b without setting up longitudinal stresses in the various parts of the coupling. The relatively soft connecting rings 12 are thus permitted to compensate for lack of alignment of the shafts without being subjected to forces tending to stretch or compress them longitudinally of the coupling due to endwise movement of the shafts. The intermediate power transmitting member 13 is supported entirely by the connecting members 12 and, due to the length of the member 13, which is formed of hard material, a large degree of misalignment of the shafts may be compensated for by changes in the angular position of the member 13 without producing substantial distortion of the members 12.

In Figs. 3 and 4 of the drawing, there is illustrated a modified form of the invention which is similar to that previously described, except that the coupling member 11 and one of the connecting rings 12 are dispensed with and a member 10 corresponding to the coupling member 17, previously described, is directly connected to an elongated power transmitting member corresponding to the previously described member 13. In this modified form of construction, two coupling members 20 and 21 are connected with an elongated intermediate power transmitting member 23 through connections which permit angular misalignment or lateral displacement of the shafts and which also allow for relative endwise movement thereof. For this purpose, the member 20 is connected with the member 23 through a connecting ring 22 of soft resilient material and the member 21 is connected with the member 23 by a jaw and socket connection which permits relative endwise and angular movement of these parts. The coupling member 20 is secured upon the end of a shaft 24 and the other coupling member 21 is secured upon the end of a substantially aligned shaft 25. The shaft 24 is provided at its end with a flattened portion 24a on one side thereof for engagement by the inner flat end of a set screw 26 which threadedly engages an aperture in the wall of the coupling member 20. The other shaft 25 is similarly provided with a flattened portion 25a which is engaged by the inner flat end of a set screw 27 which threadedly engages an aperture in the wall of the coupling member 21.

All of the members 20, 21, 22 and 23 have outer cylindrical surfaces of the same diameter and the members 20, 21 and 23 are formed of hard material, such as steel, brass, hard rubber or the like, which is substantially incompressible and which is not capable of substantial distortion under the influence of the forces which are transmitted from one shaft to the other. The member 22 is formed of relatively soft resilient material, such as soft rubber, which has been reinforced by textile fabric or the like, and it has opposite outwardly diverging end faces 22a which coact with and are vulcanized to the corresponding outwardly inclined faces 20a and 23a of the members 20 and 23, respectively, so that the parts of the connecting member which are subjected to the greatest forces of compression, when compensating for misalignment of the shafts, are of the greatest thickness.

For the purpose of connecting the member 21 with the member 23, the member 23 is provided with two oppositely disposed inwardly extending sockets 23b which open through the end face 23c of this member and which are so formed that each socket has two outwardly diverging walls 23d connected by an inner curved surface 23e. The surfaces 23d of the sockets 23b are adapted to co-act with similarly inclined faces 21d formed on the jaws 21b which extend longitudinally from and are formed integrally with the coupling member 21, so that, upon relative endwise movement of the shafts 24 and 25, the jaws 21b are permitted to slide in the sockets 23b without setting up longitudinally acting stresses in various parts of the coupling. The walls of the sockets 23b are preferably formed for an appreciable depth from the surfaces 23d and 23e, of relatively soft material, such as soft rubber or the like, as indicated at 23f, so that the walls of the sockets are capable of being deformed, and the inner curved faces 21e of the jaws, which connect the inclined faces 21d, are preferably spaced slightly from the curved surfaces 23e of the sockets. This arrangement permits distortion of the walls of the sockets 23b upon relative angular movement of the members 21 and 23, so that, when there is angular or lateral displacement of the shafts, this lack of alignment may be compensated for by the distortion of the connecting member 22 and by relative angular movement of the members 21 and 23, without the use of an additional annular connecting member as in the form of the invention previously described.

Although two forms of the invention have been shown and described by way of illustration, it will be understood that it may be constructed in various other forms which come within the scope of the appended claims. This application is a continuation-in-part of my application Serial No. 176,401, filed November 26, 1937, and now matured into Patent No. 2,146,766, dated February 14, 1939, entitled "Couplings."

I claim:

1. The combination in a coupling for connecting two substantially aligned shafts, of a pair of coupling members each adapted to be secured upon a separate one of said shafts, an elongated intermediate power transmitting member of fixed length, a deformable resilient connecting member connecting said intermediate member with one of said coupling members and having a fixed connection with that coupling member, and means for connecting the other coupling member with said intermediate member, said means including interlocking power transmitting parts including one part having jaws extending longitudinally from the end thereof to intermesh with socket members extending inwardly from the end of another part which interlocking parts have free relative movement longitudinally of said shafts.

2. The combination in a coupling for connecting two substantially aligned shafts, of a pair of coupling members each adapted to be secured upon a separate one of said shafts, an elongated intermediate power transmitting member, a deformable rubber ring vulcanized to said intermediate member and to one of said coupling members, and means including interlocking power transmitting parts comprising a resilient deformable part and a part having free relative axial movement for connecting said intermediate member with the other coupling member, said intermediate member being supported entirely by said coupling members.

3. The combination in a coupling for connecting two substantially aligned shafts, of a pair of coupling members each adapted to be secured upon a separate one of said shafts, an elongated intermediate power transmitting member, and a deformable resilient connecting member connecting said intermediate member with one of said coupling members, said intermediate member having sockets in the end thereof opposite said connecting member, the walls of said sockets being formed of deformable resilient material, the other of said coupling members having longitudinally extending jaws engaging said sockets and having free movement longitudinally of said shafts therein.

4. The combination in a coupling for connecting two substantially aligned shafts, of a pair of coupling members each adapted to be secured upon a separate one of said shafts, an elongated intermediate power transmitting member, and a deformable rubber ring vulcanized to one end of said intermediate member and to one of said coupling members, the end of said intermediate member opposite said rubber ring being provided with inwardly extending sockets opening through the outer annular surface of said member, the walls of said sockets being formed of deformable resilient material, each of said sockets having two outwardly diverging walls connected by an inner wall, the other coupling member having longitudinally extending jaws each provided with outwardly diverging surfaces contacting with two of said outwardly diverging walls of one of said sockets and with an inner part lying out of contact with the inner wall of the socket engaged thereby, said intermediate member being supported entirely by said coupling members.

5. The combination in a coupling for connecting two substantially aligned shafts, of a pair of coupling members, an intermediate power transmitting member, deformable connecting members each connecting said intermediate member with one of said coupling members, means for securing one of said coupling members on one of said shafts, and a driving member adapted to be secured on the other of said shafts and having an interlocking driving connection with the other coupling member to permit relative endwise movement of said shafts.

6. The combination in a coupling for connecting two substantially aligned shafts, of a pair of coupling members, an intermediate power transmitting member, deformable connecting members each connecting said intermediate member with one of said coupling members, means for securing one of said coupling members on one of said shafts, the other coupling member having recesses therein, and a driving member adapted to be secured on the other of said shafts and having parts intermeshing with said recesses to provide a driving connection adapted to permit relative endwise movement of said shafts.

7. The combination in a coupling for connecting two substantially aligned shafts, of a pair of coupling members, an intermediate power transmitting member, deformable connecting members each connecting said intermediate member with one of said coupling members, means for securing one of said coupling members on one of said shafts, the other coupling having sockets extending from the end thereof, and an auxiliary coupling member adapted to be secured on the other of said shafts and having longitudinally extending jaws engaging said sockets.

8. The combination in a coupling for connecting two substantially aligned shafts, of a pair of coupling members, an elongated intermediate power transmitting member formed of hard material, a pair of relatively thin rubber rings each vulcanized to one end of said intermediate member and to one of said coupling members, means for securing one of said coupling members on one of said shafts, the other coupling member having sockets extending inwardly from the end thereof, and an auxiliary coupling member adapted to be secured on the other of said shafts and having longitudinally extending jaws engaging said sockets, said intermediate power transmitting member being supported entirely by said rubber rings.

LOUIS RICEFIELD.